(12) United States Patent
Silvius

(10) Patent No.: US 9,347,588 B1
(45) Date of Patent: May 24, 2016

(54) CABLE HOLDING ASSEMBLY

(71) Applicant: Vincent Silvius, Genoa, IL (US)

(72) Inventor: Vincent Silvius, Genoa, IL (US)

( * ) Notice: Subject to any disclaimer, the term of this patent is extended or adjusted under 35 U.S.C. 154(b) by 0 days.

(21) Appl. No.: 14/573,702

(22) Filed: Dec. 17, 2014

(51) Int. Cl.
*H01R 13/62* (2006.01)
*F16L 3/12* (2006.01)
*H01R 13/58* (2006.01)
*H01R 13/639* (2006.01)

(52) U.S. Cl.
CPC .......... *F16L 3/1211* (2013.01); *H01R 13/5804* (2013.01); *H01R 13/6395* (2013.01)

(58) Field of Classification Search
CPC .................................................. H01R 13/6395
USPC .......................................... 439/371, 373, 451
See application file for complete search history.

(56) References Cited

U.S. PATENT DOCUMENTS

| | | | | |
|---|---|---|---|---|
| 1,979,756 A * | 11/1934 | Mcnamee | .......... | H01R 13/6395 174/135 |
| 3,708,778 A * | 1/1973 | McKeever | ......... | H01R 13/6395 24/130 |
| 3,951,504 A | 4/1976 | Clartk | | |
| 3,960,432 A * | 6/1976 | Wilbur | ............... | H01R 13/6395 439/296 |
| 4,357,063 A * | 11/1982 | Gray | .................. | H01R 13/6395 24/132 AA |
| 4,702,709 A * | 10/1987 | Santilli | .............. | H01R 13/6395 174/67 |
| 4,768,974 A * | 9/1988 | Cowan | ............... | H01R 13/6395 439/371 |
| 5,044,976 A * | 9/1991 | Thompson | ......... | H01R 13/6395 439/368 |
| 5,071,361 A * | 12/1991 | Wright | ................... | H01R 13/44 174/66 |
| 5,145,399 A | 9/1992 | Davenport | | |
| 5,547,390 A * | 8/1996 | Laherty | .............. | H01R 13/6395 439/373 |
| 5,655,924 A * | 8/1997 | Cross | .................. | H01R 13/6395 439/369 |
| 6,198,031 B1 | 3/2001 | Jones | | |
| D459,194 S | 6/2002 | Johansson et al. | | |
| 6,491,541 B2 * | 12/2002 | Wakino | .............. | H01R 13/5833 439/373 |
| 7,052,305 B2 | 5/2006 | Kurokawa | | |
| 7,470,141 B2 * | 12/2008 | Yoest | .................. | H01R 13/6392 439/369 |
| 7,537,477 B2 * | 5/2009 | Crossman, II | ........ | G06F 1/1613 174/135 |
| 7,563,123 B2 * | 7/2009 | Cave | .................. | H01R 13/6395 439/369 |

FOREIGN PATENT DOCUMENTS

EP          1179307        2/2002

\* cited by examiner

*Primary Examiner* — Tho D Ta

(57) ABSTRACT

A cable holding assembly for preventing an amplifier jack from being damaged while coupled to an instrument cable includes a base coupled to an instrument amplifier. A retainer is coupled to said base. The retainer may engage the instrument cable when the instrument cable is coupled to the amplifier jack to prevent damaging the amplifier jack.

15 Claims, 6 Drawing Sheets

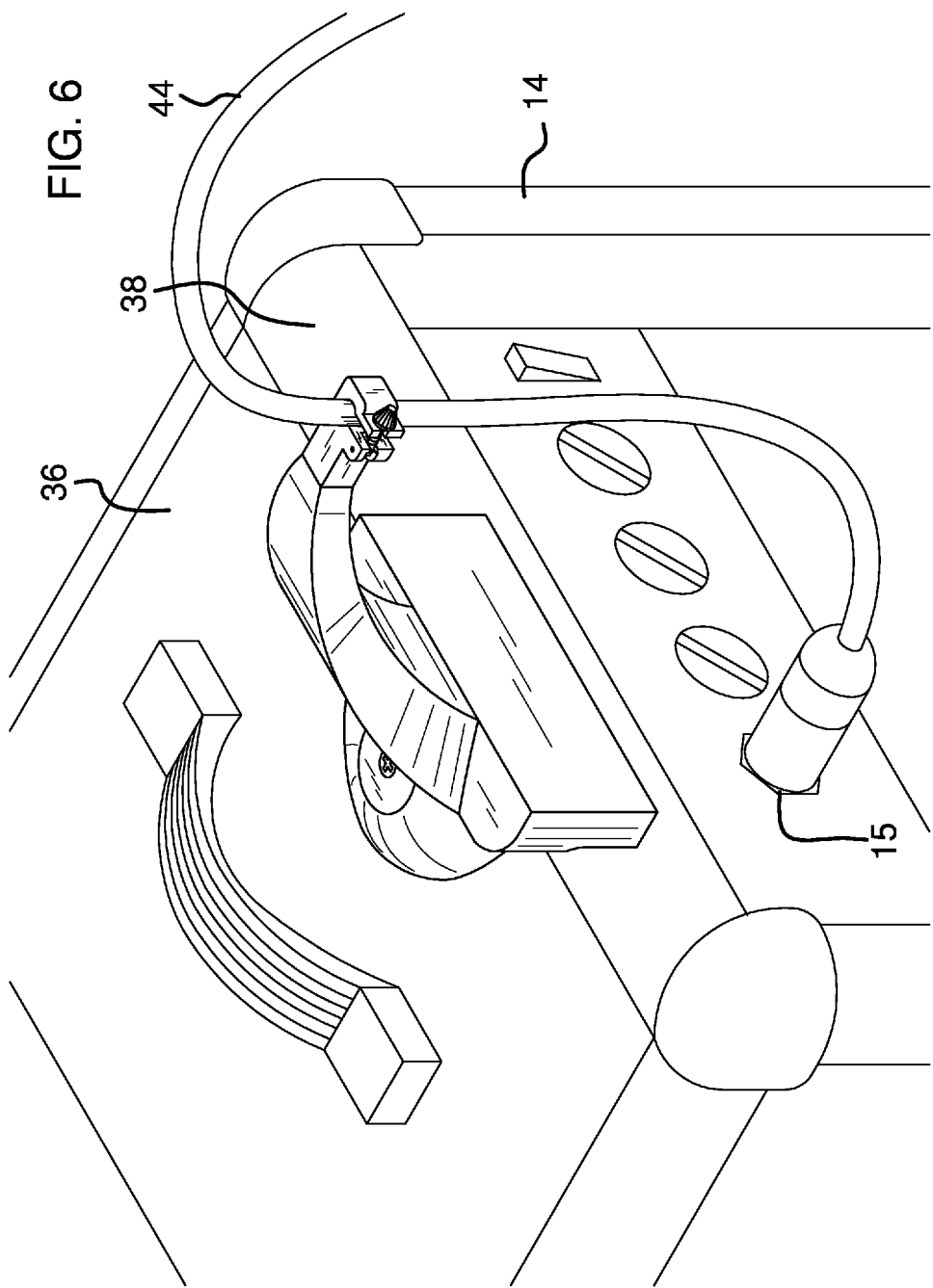

CABLE HOLDING ASSEMBLY

BACKGROUND OF THE DISCLOSURE

Field of the Disclosure

The disclosure relates to holding devices and more particularly pertains to a new holding device for preventing an amplifier jack from being damaged while coupled to an instrument cable.

SUMMARY OF THE DISCLOSURE

An embodiment of the disclosure meets the needs presented above by generally comprising a base coupled to an instrument amplifier. A retainer is coupled to said base. The retainer may engage an instrument cable when the instrument cable is coupled to the instrument amplifier to prevent damaging a jack on the instrument amplifier.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 6 is an in-use view of an embodiment of the disclosure.

DESCRIPTION OF THE PREFERRED EMBODIMENT

Figure 1:
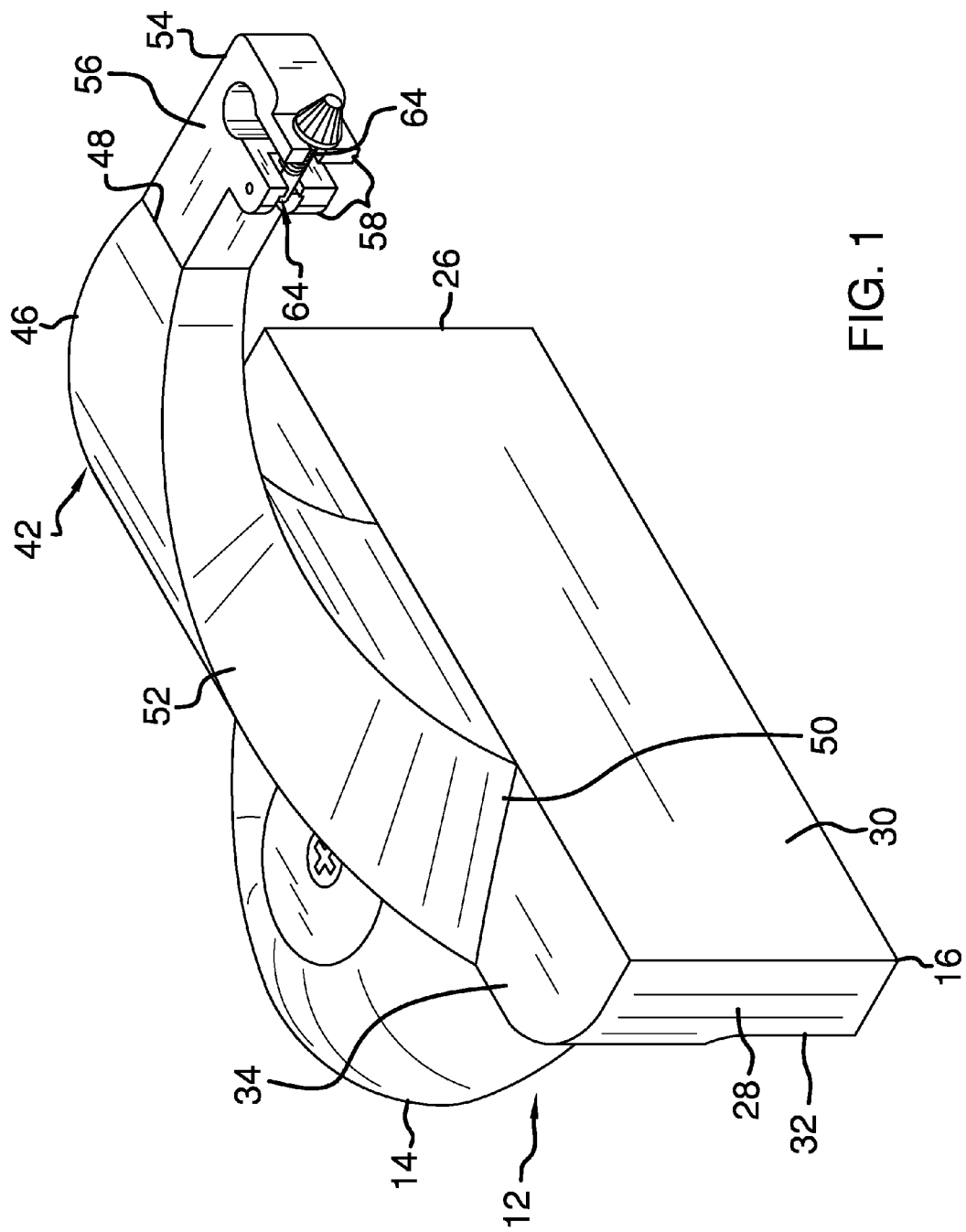
FIG. 1 is a perspective view of a cable holding assembly according to an embodiment of the disclosure.
Figure 2:
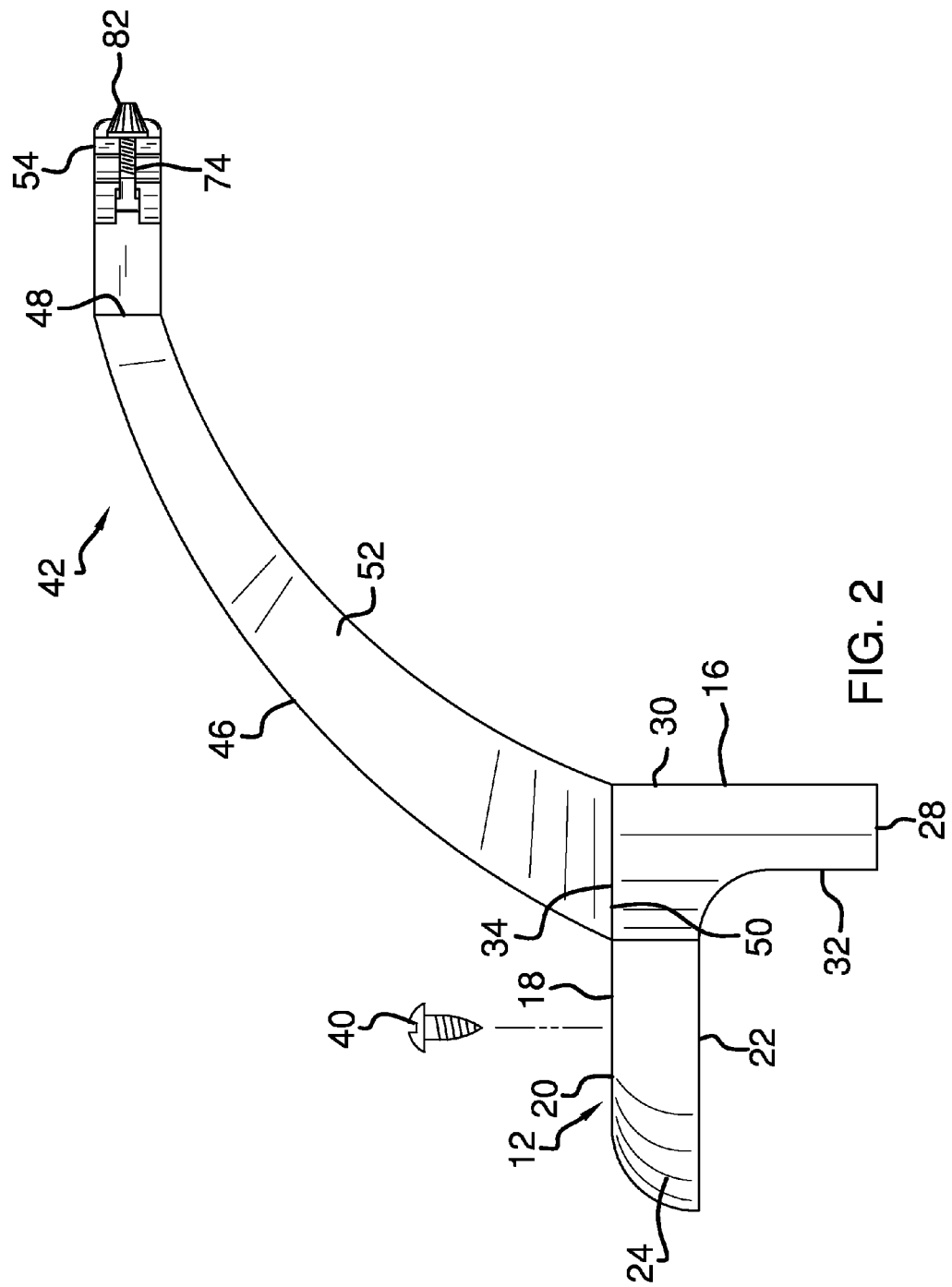
FIG. 2 is a right side view of an embodiment of the disclosure.
Figure 3:
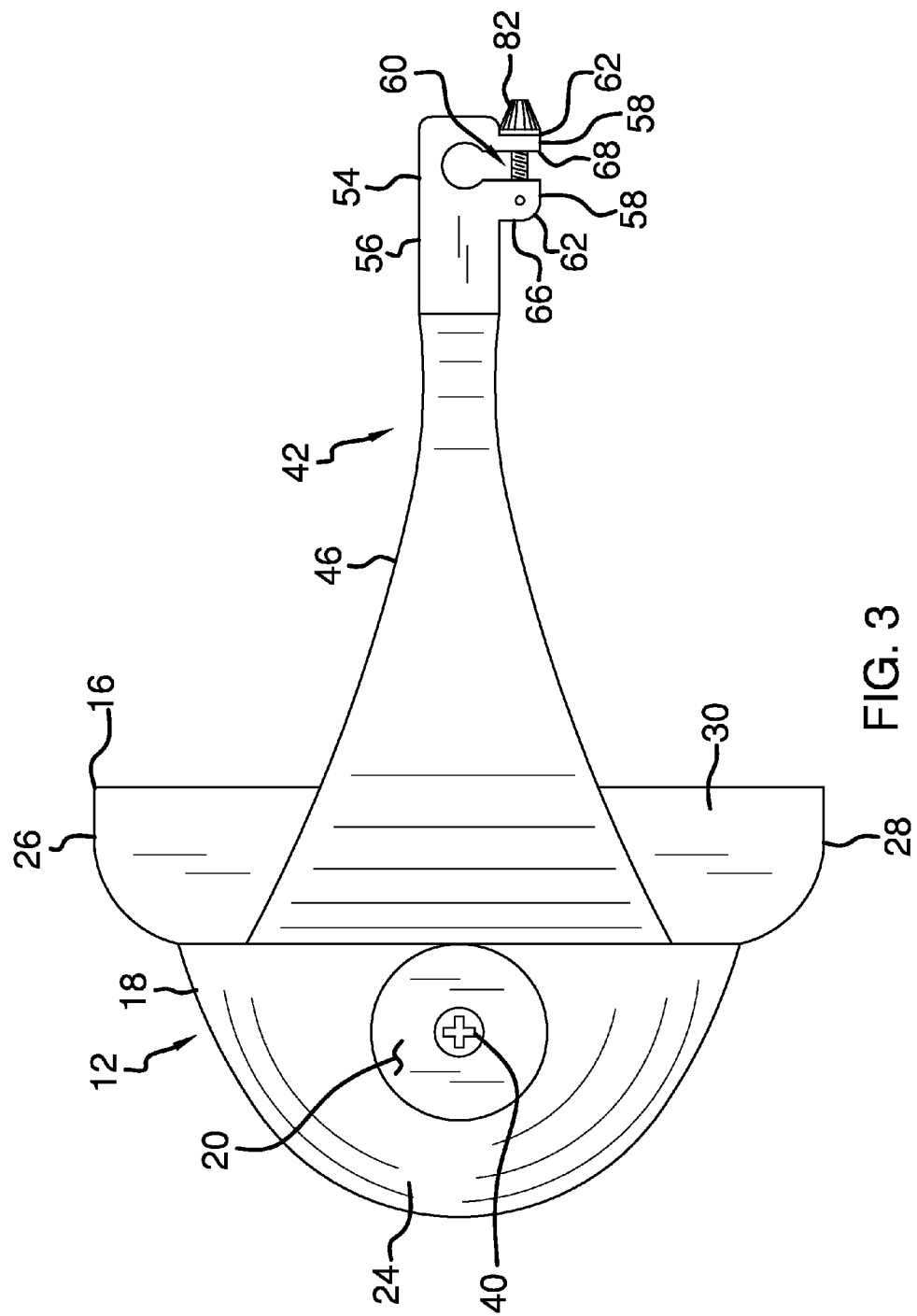
FIG. 3 is a top view of an embodiment of the disclosure.
Figure 4:
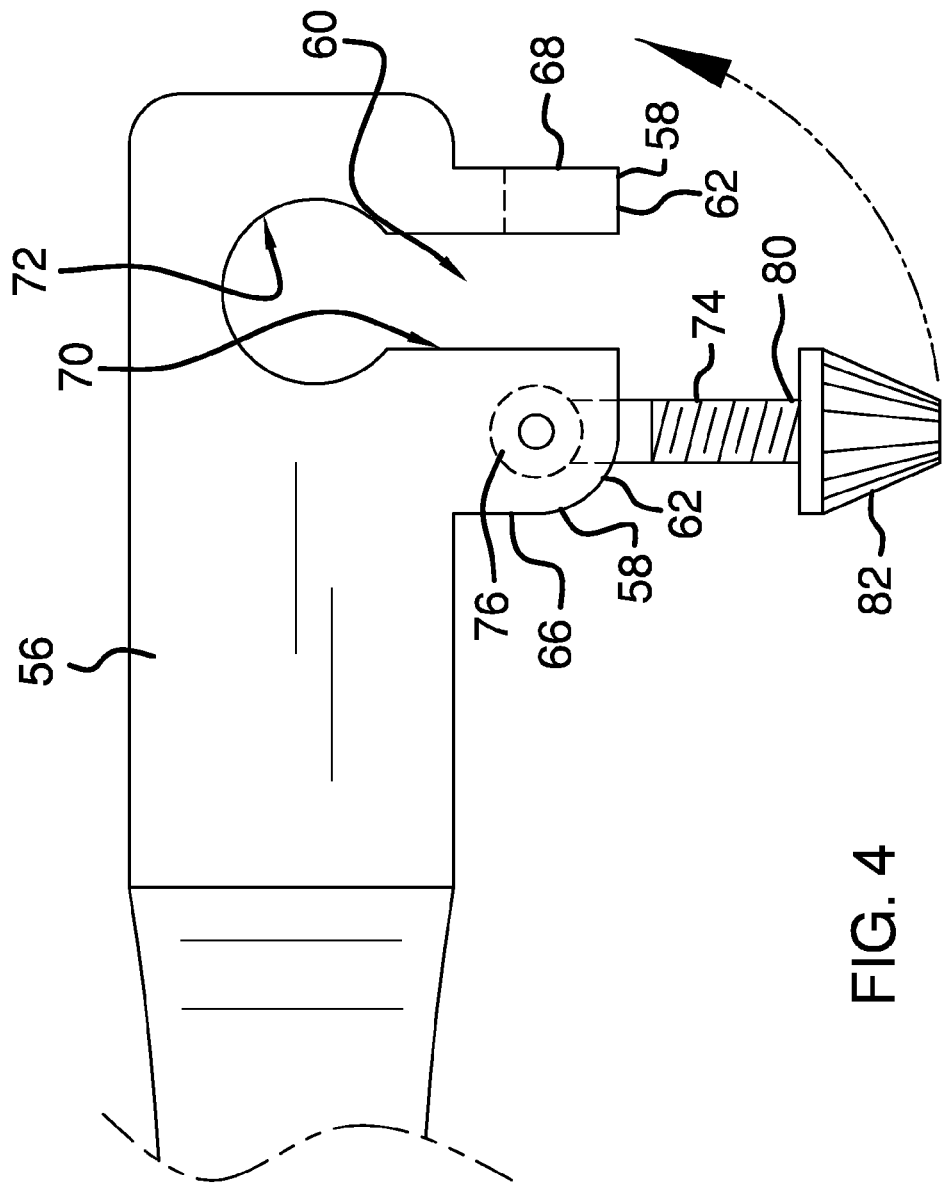
FIG. 4 is a top perspective view of an embodiment of the disclosure.
Figure 5:
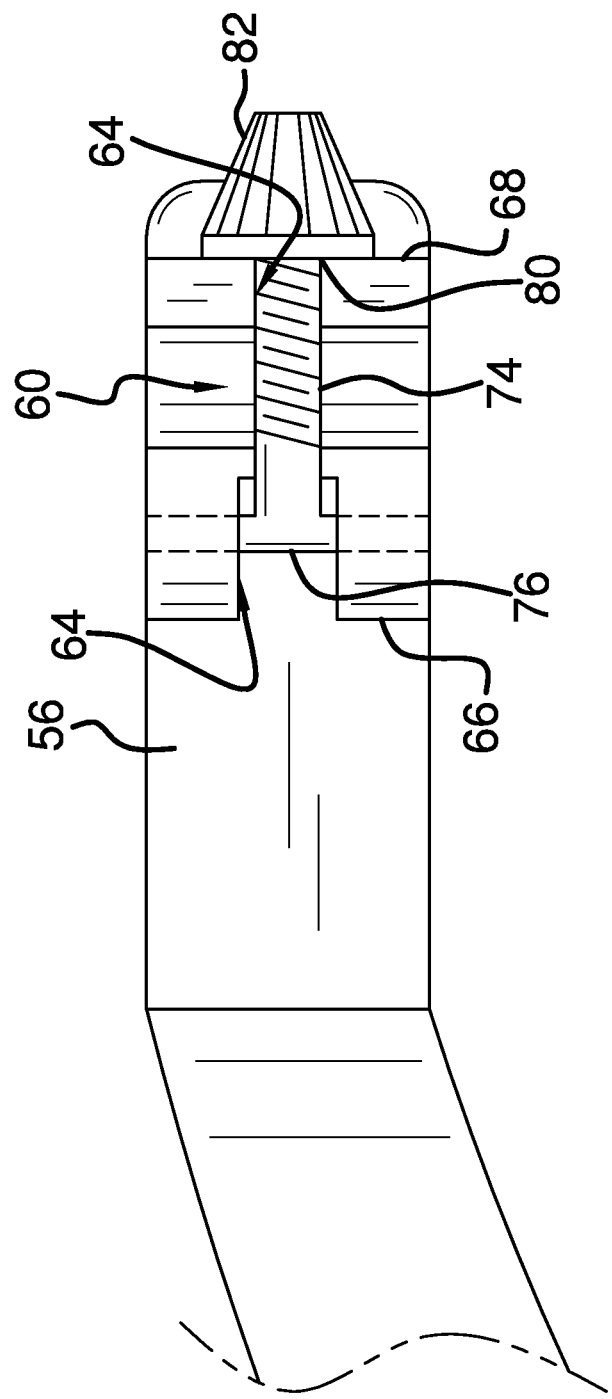
FIG. 5 is a right side perspective view of an embodiment of the disclosure.

With reference now to the drawings, and in particular to FIGS. 1 through 6 thereof, a new holding device embodying the principles and concepts of an embodiment of the disclosure and generally designated by the reference numeral 10 will be described.

As best illustrated in FIGS. 1 through 6, the cable holding assembly 10 generally comprises a base 12 coupled to an instrument amplifier 14. The instrument amplifier 14 may be of any conventional design. A jack 15 is electrically coupled to the instrument amplifier 14. The base 12 has a front section 16 and a back section 18 coupled to and extending downwardly therefrom. The back section 18 has a top surface 20, a bottom surface 22 and a perimeter edge 24 extending between the top 20 and bottom 22 surfaces. The perimeter edge 24 is convexly curvilinear, giving the back section 18 a dome-like shape.

The front section 16 has a first end 26, a second end 28 and a perimeter wall 30 extending between the first 26 and second 28 ends. The perimeter wall 30 has a rear side 32 and a top side 34. The back section 18 is coupled to and extends rearwardly from the rear side 32 of the front section 16. The front section 16 is oriented perpendicular to the back section 18. The top surface 20 of the back section 18 is positioned adjacent to the top side 34 of the front section 16. The bottom surface 22 of the back section 18 may abutted against a top 36 of the instrument amplifier 14. The rear side 32 of the front section 16 abuts a front 38 of the instrument amplifier 14.

A fastener 40 extends downwardly through the top surface 20 of the back section 18. The fastener 40 engages the top 36 of the instrument amplifier 14 to retain the base 12 on the instrument amplifier 14. The fastener 40 may be a screw of any conventional design.

A retainer 42 is coupled to the base 12. The retainer 42 may engage an instrument cable 44 when the instrument cable 44 is coupled to the jack 15. Thus, the retainer 42 prevents the instrument cable 44 from damaging the jack 15 if the instrument cable 44 is snagged or tugged. The instrument cable 44 may be of any conventional design.

The retainer 42 comprises a neck 46 that has a top end 48, a bottom end 50 and a perimeter wall 52 extending between the top 48 and bottom 50 ends. The neck 46 is elongated. The bottom end 50 is coupled to the top side 34 of the front section 16 of the base 12. The perimeter wall 52 is curved such that the neck 46 defines an arch extending upwardly and forwardly from the base 12.

A clamp 54 is coupled to the top end 48 of the neck 46. The clamp 54 has a body 56 and a pair of arms 58 extending laterally away from the body 56. The arms 56 are spaced apart to define a receiving space 60 between the arms 56. Each of the arms 56 has a free end 62. The free ends 62 each has a slot 64 extending inwardly therein toward the body 56. The arms 56 comprise a first arm 66 and a second arm 68.

The receiving space 60 includes an exterior portion 70 and an interior portion 72. The exterior portion 70 comprises a linear slot and the interior portion 72 comprises a circular slot. The exterior portion 70 is positioned adjacent to the free ends 62. The instrument cable 44 is positionable within the interior portion 72 of the receiving space 60.

A threaded member 74 is provided. The threaded member 74 has a first end 76 pivotally coupled to the first arm 66. The threaded member 74 is positionable in the slot 64 in the second arm 68 such that a second end 80 of the threaded member 74 extends laterally away from the second arm 68. A nut 82 threadably engages the threaded member 74 such that the nut 82 receives the second end 80 of the threaded member 74. The nut 82 is rotatable to urge the first 66 and second 68 arms toward each other to frictionally engage the instrument cable 44.

In use, the assembly 10 extends a service life of the jack 15 by preventing the instrument cable 44 from being snagged, pulled, bent, or otherwise transferring lateral force to the jack 15 after the instrument cable 44 is plugged into the jack 15. The assembly 10 may be permanently coupled to the instrument amplifier 14. The assembly 10 may additionally be removed after each time the instrument amplifier 14 is utilized.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cable holding assembly configured to hold an instrument cable, said assembly comprising:
   a base configured to be coupled to an instrument amplifier, said base having a front section and a back section coupled to and extending downwardly therefrom, said back section having a top surface, a bottom surface and a perimeter edge extending between said top and bottom surfaces, said perimeter edge being convexly curvilinear;
   a retainer coupled to said base, said retainer being configured to engage an instrument cable when the instrument cable is coupled to a jack on the instrument amplifier to prevent damaging the jack; and
   said front section having a first end, a second end and a perimeter wall extending between said first and second ends, said perimeter wall having a rear side and a top side, said back section being coupled to and extending rearwardly from said rear side of said front section such that said front section is oriented perpendicular to said back section, said top surface of said back section being positioned adjacent to said top side of said front section.

2. The assembly according to claim 1, wherein said bottom surface of said back section being configured to be abutted against a top of the instrument amplifier such that said rear side of said front section abuts a front of the instrument amplifier.

3. The assembly according to claim 2, wherein said retainer comprising a neck having a top end, a bottom end and a perimeter wall extending between said top and bottom ends, said neck being elongated, said bottom end being coupled to said top side of said front section of said base, said perimeter wall being curved such that said neck defines an arch extending upwardly and forwardly from said base.

4. The assembly according to claim 3, wherein a clamp coupled to said top end of said neck, said clamp having a body and a pair of arms extending laterally away from said body, said arms being spaced apart to define a receiving space between said arms, each of said arms having a free end, said free ends having a slot extending inwardly therein toward said body, said arms comprising a first arm and a second arm.

5. The assembly according to claim 4, wherein said receiving space including an exterior portion and an interior portion, said exterior portion comprising a linear slot and said interior portion comprising a circular slot, said exterior portion being positioned adjacent to said free ends.

6. The assembly according to claim 5, wherein a threaded member having a first end pivotally coupled to said first arm, said threaded member being positionable in said slot in said second arm such that a second end of said threaded member extends laterally away from said second arm.

7. The assembly according to claim 6, wherein a nut threadably engaging said threaded member such that said nut receivers said second end of said threaded member, said nut being rotatable to urge said first and second arms toward each other when such that said clamp is configured to frictionally engage the instrument cable.

8. A cable holding assembly configured to hold an instrument cable, said assembly comprising:
   a base configured to be coupled to an instrument amplifier, said base having a front section and a back section coupled to and extending downwardly therefrom, said back section having a top surface, a bottom surface and a perimeter edge extending between said top and bottom surfaces, said perimeter edge being convexly curvilinear, said front section having a first end, a second end and a perimeter wall extending between said first and second ends, said perimeter wall having a rear side and a top side, said back section being coupled to and extending rearwardly from said rear side of said front section such that said front section is oriented perpendicular to said back section, said top surface of said back section being positioned adjacent to said top side of said front section, said bottom surface of said back section being configured to be abutted against a top of the instrument amplifier such that said rear side of said front section abuts a front of the instrument amplifier;
   a retainer coupled to said base, said retainer being configured to engage an instrument cable when the instrument cable is coupled to a jack on the instrument amplifier to prevent damaging the jack, said retainer comprising:
      a neck having a top end, a bottom end and a perimeter wall extending between said top and bottom ends, said neck being elongated, said bottom end being coupled to said top side of said front section of said base, said perimeter wall being curved such that said neck defines an arch extending upwardly and forwardly from said base;
      a clamp coupled to said top end of said neck, said clamp having a body and a pair of arms extending laterally away from said body, said arms being spaced apart to define a receiving space between said arms, each of said arms having a free end, said free ends having a slot extending inwardly therein toward said body, said arms comprising a first arm and a second arm, said receiving space including an exterior portion and an interior portion, said exterior portion comprising a linear slot and said interior portion comprising a circular slot, said exterior portion being positioned adjacent to said free ends;
      a threaded member having a first end pivotally coupled to said first arm, said threaded member being positionable in said slot in said second arm such that a second end of said threaded member extends laterally away from said second arm; and
      a nut threadably engaging said threaded member such that said nut receives said second end of said threaded member, said nut being rotatable to urge said first and second arms toward each other such that said clamp is configured to frictionally engage the instrument cable.

9. A cable holding assembly configured to hold an instrument cable, said assembly comprising:
   an instrument amplifier having a jack;
   an instrument cable electrically coupled to said jack;

a base coupled to said instrument amplifier, said base having a front section and a back section coupled to and extending downwardly therefrom, said back section having a top surface, a bottom surface and a perimeter edge extending between said top and bottom surfaces, said perimeter edge being convexly curvilinear;

a retainer coupled to said base, said retainer engaging said instrument cable when said instrument cable is electrically coupled to said jack to prevent damaging said jack; and said front section having a first end, a second end and a perimeter wall extending between said first and second ends, said perimeter wall having a rear side and a top side, said back section being coupled to and extending rearwardly from said rear side of said front section such that said front section is oriented perpendicular to said back section, said top surface of said back section being positioned adjacent to said top side of said front section.

10. The assembly according to claim 9, wherein said bottom surface of said back section being abutted against a top of said instrument amplifier such that said rear surface of said front section abuts a front of said instrument amplifier.

11. The assembly according to claim 10, wherein said retainer comprising a neck having a top end, a bottom end and a perimeter wall extending between said top and bottom ends, said neck being elongated, said bottom end being coupled to said top side of said front section of said base, said perimeter wall being curved such that said neck defines an arch extending upwardly and forwardly from said base.

12. The assembly according to claim 11, wherein a clamp coupled to said top end of said neck, said clamp having a body and a pair of arms extending laterally away from said body, said arms being spaced apart to define a receiving space between said arms, each of said arms having a free end, said free ends having a slot extending inwardly therein toward said body, said arms comprising a first arm and a second arm.

13. The assembly according to claim 12, wherein said receiving space including an exterior portion and an interior portion, said exterior portion comprising a linear slot and said interior portion comprising a circular slot, said exterior portion being positioned adjacent to said free ends.

14. The assembly according to claim 13, wherein a threaded member having a first end pivotally coupled to said first arm, said threaded member being positionable in said slot in said second arm such that a second end of said threaded member extends laterally away from said second arm.

15. The assembly according to claim 14, wherein a nut threadably engaging said threaded member such that said nut receives said second end of said threaded member, said nut being rotatable to urge said first and second arms toward each other such that said clamp frictionally engages said instrument cable.

* * * * *